United States Patent [19]

Dunne et al.

[11] Patent Number: 5,260,242

[45] Date of Patent: Nov. 9, 1993

[54] METHOD OF COATING ALUMINUM SUBSTRATES WITH SOLID ADSORBENT

[75] Inventors: Stephen R. Dunne, Bethel, Conn.; Michael J. McKeon, Brewster, N.Y.; Alan P. Cohen, New Fairfield, Conn.; Albert S. Behan, Bronxville, N.Y.

[73] Assignee: UOP, Des Plaines, Ill.

[21] Appl. No.: 984,644

[22] Filed: Dec. 2, 1992

Related U.S. Application Data

[62] Division of Ser. No. 846,093, Mar. 5, 1992, which is a division of Ser. No. 386,319, Jul. 28, 1989, Pat. No. 5,120,694.

[51] Int. Cl.$^5$ .......................... B01J 20/18; B01J 20/08
[52] U.S. Cl. ........................................ 502/63; 502/64; 502/68
[58] Field of Search ..................... 501/1, 2, 60, 63, 64, 501/67, 68

[56] References Cited

U.S. PATENT DOCUMENTS

| | | | |
|---|---|---|---|
| 3,788,880 | 1/1974 | Mensenkamp et al. | 117/70 S |
| 4,180,482 | 12/1979 | Nishino et al. | 502/50 |
| 4,460,630 | 7/1984 | Nishino et al. | 427/362.2 |
| 4,578,372 | 3/1986 | Hoving et al. | 502/74 |
| 4,610,700 | 9/1986 | Miller et al. | 502/67 |
| 4,758,281 | 7/1988 | Eckler et al. | 106/467 A |

*Primary Examiner*—Carl F. Dees
*Attorney, Agent, or Firm*—Thomas K. McBride; John G. Tolomei; Richard P. Silverman

[57] ABSTRACT

Layered adsorbent-substrate composites are prepared by methods comprising heating the surface of an aluminum substrate, contacting the surface of the substrate with a slurry containing the adsorbent and a binder, and heating the coatings to form hardened surfaces which can have excellent adsorption and mechanical properties and have a variety of uses such as adsorbents in automobile mufflers and a desiccants in multiple pane windows.

2 Claims, No Drawings

METHOD OF COATING ALUMINUM SUBSTRATES WITH SOLID ADSORBENT

CROSS-REFERENCE

The present application is a divisional of U.S. Ser. No. 846,093, filed Mar. 5, 1992 which is a divisional of U.S. Ser. No. 386,319, filed Jul. 28, 1989, now U.S. Pat. No. 5,120,694.

FIELD OF THE INVENTION

The present invention relates in general to adsorbent composites and more particularly to methods for coating an aluminum substrate with a layer of solid adsorbent to form adsorbent-substrate composites and to processes for utilizing the adsorbent coatings.

BACKGROUND OF THE INVENTION

There are a variety of solid adsorbents which have been useful in adsorption and catalysis including commonly known materials such as activated carbons, activated clays, silica gel, activated alumina, and crystalline molecular sieves. Of these adsorbents, crystalline molecular sieves such as silicoaluminophosphates, aluminophosphates and aluminosilicate zeolites have been particularly useful because of their uniform pore size.

In many instances it is desirable to have the solid adsorbent deposited on a substrate as a coating instead of being contained in particulate form as pellets, beads, or other particles. There are several reasons why solid adsorbent coatings have been used including for example, to improve the catalytic or adsorption properties of the solid adsorbent by improving the surface area to weight ratio, to reduce the amount of solid adsorbent required, to protect the underlying substrate material from a harmful environment, to achieve a particular strength or form, and, to perform the particular adsorptive or catalytic function over the entire coated surface of the substrate.

Not surprisingly, there have been a diversity of end uses for solid adsorbent coatings. Moreover, the methods for applying the coatings have been varied and somewhat dependent on the particular end use.

For instance, in the area of corrosion prevention, U.S. Pat. No. 3,788,880 discloses a method of inhibiting corrosion of metal surfaces wherein a metal surface, e.g. of brass, is coated with a precipitate of a corrosion-retarding inorganic salt, e.g., a calcite from water, i.e., preferably ordinary utility water containing the salt and under the electrochemical effect of local polarity differences along the metal body, where upon the corrosion-inhibiting layer is used to bond, by ion-exchange interaction, an ion-exchange substance to the surface. Together, the corrosion-inhibiting and ion-exchange substances, i.e., a natural or synthetic zeolite, form a three-dimensional stable coating which is adherent and prevents localized corrosion.

Moreover, numerous lacquer or pigment type coatings have also been used in corrosion prevention, some of which contain zeolites. For example, U.S. Pat. No. 4,758,281 discloses a corrosion inhibiting pigment which comprises particulate zeolite that can be used in protective coatings for metals, e.g. paints, varnishes, lacquer, water-borne coatings, etc.

Also related to corrosion prevention, U.S. Pat. No. 4,610,700 discloses absorbent compositions useful in retarding corrosion in mufflers and sets forth at col. 5, line 10 to line 18, that:

"Coatings of tubes, bulkheads and/or internal surfaces with adsorbent is also feasible. Simulated coatings can be accomplished with an adsorbent loaded material or heat-resistant tape. Actual slip coatings made of silica-rich slurries of adsorbent powder can also be used to coat surfaces. Such a slurry can be used to dip, spray or otherwise cover any surface. The coating is hardened by heating the part to about 200° C. either during production or on the vehicle."

Solid adsorbent coatings have also been used as catalysts in chemical processes. For example, zeolite coated substrates intended for use in fluidized bed reactors have been prepared by a process wherein the zeolite itself is crystallized on the substrate in a reaction mixture. U.S. Pat. No. 4,578,372 discloses at col. 3, lines 5 to line 23 that:

"In one aspect this invention provides a process for the preparation of a zeolite layer upon a substrate which does not have the same crystalline structure as the zeolite, in which process the substrate is contacted with a reaction mixture for forming a zeolite and the reaction mixture is heated to bring about zeolite formation, in which the substrate is tumbled within the reaction mixture during heating so as to cause zeolite formation preferentially as a layer on the surface of the substrate.
The invention enables the zeolite to be formed as a layer on the substrate in preference to it being formed as pure zeolite particles within the body of the reaction mixture. It is believed that the mixing technique employed results in the preferential formation of nucleation centers upon the substrate surface rather than within the reaction mixture. Moreover, the product of the process of the invention comprises discrete substrate bodies coated with zeolite rather than agglomerates of separate zeolite particles with substrate bodies."

Some self-cleaning cooking ovens utilize zeolite catalyst layers coated on the internal surfaces of the oven to catalyze the cleaning action. U.S. Pat. No. 4,460,630 relates to a method of forming porcelain enamels on aluminized steel wherein a zeolite-coating porcelain enamel layer is applied to an underlying ground coating of porcelain enamel on the aluminized steel. The above-mentioned patent sets forth a coating method at col. 5, line 38 to line 53, wherein;

"The slip for the first layer . . . is then applied on the metal substrate and dried at a temperature not exceeding 350° C. to form the first coating.
Next, a second slip comprising a frit and an oxidizing catalyst for the second layer is applied on the dried first coating. The application of the second slip is ordinarily made by spraying. The second slip coating is also dried, and then both the first and the second coatings are fired at the same time.
For the metal substrate of the mild steel sheet for enamel, the firing is made at a temperature between 780° C. and 820° C. for 3 to 5 minutes. For the metal substrate of the aluminized steel sheet, the firing is made at a temperature between 520° C. and 600° C. for 3 to 5 minutes."

The term "slip" is generally used in porcelain enamel engineering to mean a slurry comprising a frit which consists of glass compositions that soften upon firing to form the porcelain enamel layer, and a binder as well as other additives.

Despite the diversity of coating methods and end uses known to exist, new methods are sought which can be used to coat aluminum substrates with solid adsorbent without the use of adsorbent formation reactions, frits and enamels, paints, varnishes and the like, in order to provide adsorbent-substrate composites that have physical and performance properties suitable for general use.

SUMMARY OF THE INVENTION

The present invention provides adsorbent-substrate composites wherein solid adsorbents are bonded to aluminum substrates. These composites can form coatings that have improved adsorption properties over pelleted or beaded adsorbent particles as well as excellent physical and thermal cycling properties.

The present invention provides methods of coating a surface of an aluminum substrate such as aluminum metal, aluminized steel or aluminized ceramic, with a layer of solid adsorbent which includes the steps of heating the surface in an oxygen containing atmosphere, preferably containing at least about 1 mol % oxygen and more preferably consisting of air, to a temperature sufficient to enable bonding of the solid adsorbent to the surface and preferably oxidation of the surface, wherein the temperature is at least about 200° C., preferably between about 250° C. and 650° C., and most preferably between about 350° C. and 650° C., contacting the heated surface with a slurry comprising the solid adsorbent and a binder in a suspending liquid to form a slurry-coated surface, and removing sufficient liquid to form a coating thereon. In a preferred aspect, the coated surface is additionally heated to a temperature and for a period of time sufficient to cause hardening thereof, wherein the temperature is at least 200° C., preferably between about 400° C. and 650° C., and the time is at least 0.25 hours and preferably about 1 hour. Other preferred aspects involve utilizing, as the solid adsorbent, crystalline molecular sieves, more preferably zeolites, and most preferably Zeolite A, Zeolite X, Zeolite Y, chabazite and mixtures thereof.

A particularly preferred aspect of the present invention provides a method of coating surface of an aluminum substrate with a layer of molecular sieve which includes the steps of heating the surface in an oxygen containing atmosphere to a temperature of about 350°-650° C. to form a heated, oxidized, surface, contacting the heated, oxidized, surface with a slurry having solid materials containing about 60 to 95 wt. % molecular sieve and about 5 to 40 wt. % binder, said solid materials comprising about 10 to 40 wt. %, preferably about 30 wt. % of the total weight of the slurry with the balance comprising a suspending liquid, to form a slurry-coated surface, and heating the slurry-coated surface to a temperature of from about 550°-650° C. for about 1 hour to remove sufficient liquid to form a coating thereon and cause hardening thereof.

The layered adsorbent-substrate composites produced by the method of the present invention can have improved adsorption properties over pelleted or beaded adsorbent particles. Moreover, the composites have a variety of end use applications particularly in processes for separating at least one molecular species from a mixture thereof with at least one other molecular species by means of selective adsorption, such as where the adsorbent coating is applied to an internal part of a muffler used in conjunction with an internal combustion engine for inhibiting corrosion, or where the adsorbent coating is applied to an internal surface of an aluminum multiple pane window spacer.

DETAILED DESCRIPTION OF THE INVENTION

The present invention provides adsorbent-substrate composites and methods for preparing the composites by coating an aluminum substrate with a layer of solid adsorbent, preferably molecular sieve, and more preferably zeolite. Other aspects of the present invention relate to process for utilizing the adsorbent coatings.

The aluminum substrates used in the present invention provide structural support for the solid adsorbent layer as well as provide a suitable bonding medium for the solid adsorbent and binder. The substrate may be, for example, aluminum metal, aluminized steel, aluminized ceramic and other similar materials. The substrate may be in various forms including, but not limited to, sheets, foils, tubes, wires, plates, balls, bars, chains, mesh or particles. It is not necessary for the aluminum substrate to be chemically treated or washed with solvent in order to practice the present invention, however the substrate should be relatively free from large amounts of foreign matter which may adversely affect bonding, such as dirt or grease.

Virtually any synthetic or naturally occurring solid adsorbent capable of maintaining its physical integrity during the coating process is suitable for use according to the present invention. The selection of the particular solid adsorbent will depend on factors such as its effective pore diameter and the particular end use intended. The term "effective pore diameter" is conventional in the art and is used herein to functionally define the pore size in terms of the size of molecules that can enter the pores rather than actual dimensions which are often difficult to determine as the pores are often irregularly shaped, i.e., non-circular. D. W. Breck, in *Zeolite Molecular Sieves*, John Wiley and Sons, New York, 1974, at pages 633 to 641, provides a discussion of effective pore diameter which is hereby incorporated by reference.

Although there are a variety of solid adsorbents which are suitable for use according to the present invention including but not limited to activated carbons, activated clays, silica gel, activated alumina and crystalline molecular sieves, molecular sieves are preferred for adsorption and catalysis because of their uniform pore size, i.e., effective pore diameter. These molecular sieves include, for example, the various forms of silicoaluminophosphates, and aluminophosphates disclosed in U.S. Pat. Nos. 4,440,871, 4,310,440, and 4,567,027, hereby incorporated by reference, as well as zeolitic molecular sieves.

Zeolitic molecular sieves in the calcined form may be represented by the general formula:

$$\frac{Me_2O}{n}: Al_2O_3: xSiO: yH_2O$$

where Me is a cation, x has a value from about 2 to infinity and y has a value of from about 2 to 10.

Typical well known zeolites which may be used include, chabazite, also referred to as Zeolite D, clinoptilolite, erionite, faujasite, also referred to as Zeolite X and Zeolite Y, ferrierite, mordenite, Zeolite A, and Zeolite P. Detailed descriptions of the above-identified zeolites, as well as others, may be found in D. W. Breck, *Zeolite Molecular Sieves*, John Wiley and Sons, New York, 1974, hereby incorporated by reference. Other zeolites suitable for use according to the present invention are those having a high silica content, i.e. those having silica to alumina ratios greater than 10 and typically greater than 100. One such high silica zeolite is silicalite, as the term used herein includes both the silicapolymorph disclosed in U.S. Pat. No. 4,061,724 and also the F-silicalite disclosed in U.S. Pat. No. 4,104,294, hereby incorporated by reference.

For purposes of the present invention it is required that the solid adsorbent be agglomerated with a binder in order to ensure that the coating will have suitable physical properties. Although there are a variety of synthetic and naturally occurring binder materials available such as metal oxides, clays, silicas, aluminas, silica-aluminas, silica-zirconias, silica-thorias, silica-berylias, silica-titanias, silica-alumina-thorias, silica-alumina-zirconias, mixtures of these and the like, clay type binders are preferred. Examples of clays which may be employed to agglomerate the zeolites without substantially altering the adsorptive properties of the zeolite are attapulgite, kaolin, volclay, sepiolite, palygorskite, kaolinite, bentonite, montmorillonite, illite and chlorite. Volclay binder is particularly preferred for practicing the present invention and may be obtained from UOP, Des Plaines, Ill. It is to be understood that certain solid adsorbents, such as activated alumina, can function adequately as both the adsorbent and the binder. Hence, in such a case, it is not necessary to utilize an additional binder. However, it may nonetheless be advantageous to use an additional binder, such as clay, for economic reasons, etc.

According to the present invention the aluminum substrate is coated with the solid adsorbent by contacting the surface of the substrate, after heating the surface as hereinafter described, with a slurry comprising the solid adsorbent and binder. The solid particles used in the slurry including both the solid adsorbent and binder material may be of any size functionally suitable in the present invention. However, the solid adsorbent and binder are desirably present as small particles, preferably having a particle size of from about 1 to 500 microns more preferably from about 1 to 50 microns.

If necessary, the solid particles may be subjected to mechanical size reduction, e.g., grinding, crushing, milling and the like, in order to obtain the desired particle size. However, it is preferred that the solid particles be more smooth, and more preferably also more spherical, relative to solid particles of similar composition obtained by mechanical size reduction. Such particle smoothness and sphericity tends to improve evenness of the coating and may also allow increased solids loading in the slurry, if desired. One particularly useful processing step to achieve such smoothness and sphericity is to employ spray drying as part of the said particle manufacturing process to form the solid particles or precursors of the solid particles. And additional advantage of employing such spray drying is that the conditions of such step can be controlled so that the product solid particles are of a desired particle size or size range. The use of spray drying in such solid particle manufacturing is conventional and well known, and therefore need not be discussed in detail here. It is to be understood that the solid adsorbent and binder may be agglomerated and subjected to size reduction prior to forming the slurry, if desired.

The solid adsorbent and binder may be mixed in the slurry in a variety of proportions, whether as segregated or agglomerated particles, although it is generally desirable to use only as much binder as is required to give sufficient strength to the coated surface. It is preferred that the adsorbent portion comprises about 60 to 95 wt. % of the total weight of solids, i.e., adsorbent and binder, in the slurry and that the remaining 5 to 40 wt. % comprises binder. In addition to the adsorbent and binder, the slurry may contain a dispersing agent or surfactant to aid in suspending the particles or vary the viscosity of the slurry. Suitable surfactants include for example, Dispex, a salt of a polymeric carboxylic acid available from Allied Colloids, Suffolk, Va., and TSPP, a tetrasodium pyrophosphate available from Monsanto, St. Louis, Mo. When a surfactant or dispersing agent is used, it is preferred that its concentration be in the range of about 0.5 to 5.0 wt. % of the solids content of the slurry.

While it can be appreciated that the solid adsorbent and binder can be suspended in a dry slurry, i.e., fluidized bed, it is desirable in accordance with the present invention that the slurry contain a suspending liquid. The suspending liquid should be one which is not likely to chemically react, e.g., by itself or with the aluminum substrate or other components in the slurry. More preferably, the suspending liquid should be substantially non-reactive and should not interfere with the internal pores of the solid adsorbent. Water is a preferred suspending liquid for use according to the present invention. The proportion of suspending liquid can be varied to adjust the viscosity of the slurry and hence, the thickness of the coating. The determination of the appropriate proportions to achieve the desired coating thickness can be made experimentally by measuring the thickness resulting from a given slurry and then either increasing the solids proportion, i.e. higher viscosity, to obtain a thicker coating, or decreasing the solids proportion, i.e., lower viscosity, to obtain a thinner coating. One way to determine the thickness of the coating is to calculate the area density coverage, i.e., the weight of solid adsorbent per unit area, and then divide by the density of the solid adsorbent. It is generally preferred that the solid materials comprise about 10 to 40 wt. %, and preferably about 30 wt. % of the total weight of the slurry, with the balance preferably consisting essentially of the suspending liquid and any surfactants or dispersing agents.

In order to ensure sufficient bonding of the solid adsorbent to the aluminum substrate, it is necessary to heat the surface of the substrate in an oxygen containing atmosphere, preferably containing at least about 1 mol % oxygen and more preferably consisting of air, to a temperature of at least 200° C., preferably between about 250°–650° C., and most preferably between about 350°–650° C. This heating preferably causes the surface of the substrate to become oxidized. While not wishing to be bound to any particular theory, it is suspected that the oxidation is at least partially responsible for achieving sufficient bonding.

The heated surface is then contacted with the slurry, preferably by dipping the surface into the slurry or by spraying the slurry onto the surface, to form a slurry-coated surface. If, after the initial contacting, it is desired to increase the thickness of the coating, additional contacting steps can be performed. When such additional contacting is performed, it is not necessary to reheat the substrate.

Although the slurry-coated surface can then simply be allowed to dry or otherwise treated, e.g., by heating at an elevated temperature, to remove sufficient liquid to form the coating, a preferred method further comprises an additional heating step where the adsorbent coated surface is heated to a temperature and for a period of time sufficient to cause hardening of the coated surface. This temperature should be at least about 200° C., preferably between about 400° C. and 650° C., and most preferably between about 550°-650° C. When this additional heating step is performed, it is not necessary to perform a separate liquid removal step, e.g. drying, since during the additional heating step sufficient liquid can be removed from the slurry-coated surface to form a coating thereon, as well as to cause hardening thereof. The time required to cause hardening of the coated surface is desirably at least 0.25 hours and preferably about 1 hour.

The resulting adsorbent-substrate composite comprises an underlying aluminum substrate layer and an outer layer bonded to the surface of the aluminum substrate consisting essentially of adsorbent and binder. These coatings provide a high surface area as well as a minimum diffusion path for the components adsorbed on the adsorbent and hence, superior rates of adsorption compared to pelleted or beaded forms of adsorbent. Moreover, the adsorbent coatings have excellent physical durability and are resistant to chipping and flaking. Furthermore, despite differences in the thermal expansion properties between the adsorbent and the aluminum substrate, the adsorbent coatings of the present invention advantageously retain their physical integrity even after repeated thermal cycling. Without wishing to be bound to any particular theory, it is thought that the heating step performed prior to the contacting step, in addition to causing oxidation of the substrate, may change the grain structure of the aluminum substrate to advantageously provide improved bonding properties.

Another aspect of the present invention relates to processes for utilizing the adsorbent substrate composites. It can be appreciated that a adsorbent coated aluminum substrate prepared by the method of the present invention will have many uses particularly in processes for separating at least one molecular species from a mixture thereof with at least one other molecular species by means of selective adsorption.

For example, above-identified U.S. Pat. No. 4,610,700, hereby incorporated by reference, relates to adsorbent compositions used in conjunction with mufflers to adsorb water from exhaust gases and prevent corrosion. Although this patent discloses various ways to contain the adsorbent compositions within the muffler including the slip coating method quoted above from col. 5, line 10 to line 18, it does not specifically disclose or suggest the method of the present invention. The adsorption compositions of the present invention are particularly well suited for this type of application because of the excellent performance, physical and thermal cycling properties associated therewith.

As disclosed in U.S. Pat. No. 4,610,700, suitable adsorbent compositions for use in mufflers, comprise a combination of a crystalline zeolite having the chabazite crystal structure with a crystalline zeolite having a faujasite crystal structure. This combination of zeolites when utilized in the mufflers exhibits an unexpected synergism in reducing the amount of muffler corrosion.

The mineral chabazite (also heretofore denominated Acadialite, Haydenite, Phacolite and Glottalite) is a widely-occurring zeolite found in Ireland, Nova Scotia and Colorado, USA, among other places and has a typical unit cell content of $Ca_2[(AlO_2)_4(SiO_2)_8]13H_2O$. It is the preferred chabazite-type zeolite for this use. Synthetic forms of the chabazite-type structure are also known, notably Zeolite D, whose synthesis and structure are described in detail in British Patent No. 868,846 (1961).

The faujasite-type of crystalline zeolite is represented principally by the well-known synthetic Zeolite X and Zeolite Y. At present no significant deposits of the mineral faujasite are known to exist. Zeolite X has a maximum molar $SiO_2/Al_2O_3$ ratio of 3, and accordingly does not possess a very substantial resistance toward structural degradation by acid attack. Zeolite Y and its myriad of modified forms can have molar $SiO_2/Al_2O_3$ ratios of greater than 3 up to several hundred. Preferably a zeolite Y having a molar $SiO_2/Al_2O_3$ ratio of from 4 to 20 is employed for this use.

The synergistic effect of the combination of chabazite-type and faujasite-type of zeolites in inhibiting muffler corrosion is evidenced in mixtures of the two in all proportions, but is more significantly exhibited, and hence preferred, when one of the zeolite types is present in an amount of from $\frac{1}{3}$ to 3 times the other zeolite type on an anhydrous weight basis. As used herein the anhydrous weight of a zeolite constituent is arbitrarily defined as the weight of the zeolite after being calcined in vacuum at 300° C. for 3 hours. More preferably the combined chabazite-type and faujasite-type zeolites constitute at least about 70 weight % of the overall adsorbent-containing mass inserted into the inner cavity of the muffler. The remaining 30 wt. % of the mass can comprise any of several of the known zeolite binder materials such as clays, alumina or silicas.

Of the various cation forms in which the present zeolite materials can exist, it is preferred that in the faujasite-type zeolite, at least about 50 percent of the $AlO_4$ framework tetrahedra be associated with sodium cations, and that at least about 50 percent of the $AlO_4$ tetrahedra of the chabazite-type zeolite be associated with sodium cations or calcium cations or a combination of these two cation species.

While it is preferred that both types of zeolite employed for this use be combined into the same adsorbent mass, it will be obvious to those of even routine skill in the art that a number of different arrangements are possible which achieve the desired results.

The use of an adsorbent coating comprising the above-mentioned zeolites as internal aluminum or aluminized steel muffler parts represents several improvements over other adsorbent containment methods. No bags or containers are needed to keep the adsorbent mass within the muffler. As previously noted, the thin uniform layer of adsorbent can have superior adsorption rates, i.e., water pick up rates, over beaded or pelleted adsorbents. The application of the adsorbent to the muffler parts can be controlled so that each specific muffler can be treated with the most effective amount of adsorbent for its given size and intended service. Moreover, no welding or fastening operations are required to affix the adsorbent mass in place.

Another beneficial use for the adsorbent-substrate composites is as a desiccant applied to the internal surfaces of an aluminum spacer in a multiple pane window. Multiple pane windows routinely contain adsorbents in the internal spaces to adsorb water and solvent to prevent condensation in the window which can cause poor visibility and asthetics. The solid adsorbent is commonly held in a generally rectangular or T-shaped aluminum tube which is either perforated or not completely sealed so that the enclosed air containing water or solvent gases or mixtures thereof may have contact with the adsorbent. In accordance with the present invention, adsorbents suitable for use in multiple pane windows are applied to the internal surfaces of aluminum window spacers. The application may be performed either on the formed spacer or optionally on the aluminum strip or parts thereof before the forming process.

Multiple pane windows often contain several types of well known adsorbents including zeolites 3A, 4A, 13X and silica gel and mixtures thereof. These adsorbents are obtainable from UOP, Des Plaines, Ill. One preferred adsorbent for use according to the present invention, either alone or in combination with other adsorbents, is zeolite 3A which has an effective pore diameter in the range about 3 Angstrom units, strongly and readily adsorbs water vapor but does not substantially adsorb either oxygen or nitrogen. U.S. Pat. Nos. 2,964,803 and 4,141,186 generally relate to the use of desiccants in multiple pane windows.

A variety of other applications will be found to exist for adsorbent coatings made in accordance with the present invention. For example, in the areas of cooling, refrigeration, and dehumidification, desiccants are used and often attached to desiccant wheels which rotate in and out of adsorption and regeneration zones. In accordance with the present invention, adsorbents may be applied to aluminum substrates e.g., aluminum foils, which can then be attached to the framework of the desiccant wheels.

EXAMPLES

The following examples are provided for illustrative purposes and are not intended to limit the scope of the claims that follow.

EXAMPLE I

A slurry was prepared by combining about 450 grams of chabazite ore, about 450 grams of sodium A zeolite, about 100 grams of Volclay 200 binder, and about 5.6 grams of TSPP with about 1843 grams of water. The chabazite ore, sodium A zeolite, and Volclay 200 binder were obtained from UOP, Des Plaines, Ill. The TSPP was obtained from Monsanto, St. Louis, Mo. The resulting slurry had the following composition.

| Component | Weight Percent | Particle Size (microns) |
|---|---|---|
| Chabazite | 15.8 | 5 |
| Sodium A Zeolite | 15.8 | 5 |
| Volclay 200 | 3.5 | 0.5 |
| TSPP | 0.2 | — |
| Water | 64.7 | — |
|  | 100.0 |  |

EXAMPLE II

Three samples were coated in order to demonstrate the method of the present invention. Samples A and B consisted of TI-40 aluminized steel sheets approximately 2.5 cm long, 1.0 cm wide, and 0.7 mm thick. Sample C consisted of low carbon steel having about the same dimensions as samples A and B.

Samples A and C were heated in an electrically heated furnace in an air atmosphere at 650° C. for about 2 minutes. The samples were removed from the furnace and immediately sprayed with the slurry prepared in Example I. Sample B was not heated and was sprayed with slurry at about room temperature. Samples A, B and C were then returned to the furnace and heated at 650° C. for 1 hour and subsequently allowed to cool to room temperature.

Each of the samples was then tested for physical integrity by releasing them from an elevation of about 1 foot onto a laboratory bench top. Sample A was the only sample which maintained its physical integrity after this test. Both samples B and C exhibited cracking and flaking thereby demonstrating inadequate bonding of the solid adsorbent to the substrates.

EXAMPLE III

A perforated, cylindrical, aluminized steel muffler tube approximately 4.1 cm diameter, 10 cm long, and 1.5 mm thick, was coated in accordance with the method of Example II for samples A and C. The muffler tube was further subjected to the physical integrity test described in Example II and did not exhibit any cracking or flaking. Thereafter, the muffler tube was heated to 300° C. and cooled to room temperature three times, after which the physical integrity test was repeated. Again, the thermally cycled muffler tube exhibited no loss of physical integrity.

The thickness of the adsorbent coating on the muffler tube was calculated by dividing the area coverage, 0.04221 grams/cm$^2$, by the adsorbent density, 0.92 grams/cm$^3$, to obtain a thickness of 0.046 cm (0.46 mm).

EXAMPLE IV

An aluminized steel muffler tube sample, as described in Example III, and a mesh bag sample containing the same quantity of adsorbent in (beaded or extrudate) form were initially heated for about 15 hours under a dried nitrogen purge at 300° C. The samples were then placed on a balance, exposed to air at 28% relative humidity, and allowed to cool to room temperature. The weight gain, as a function of time, i.e., water pick-up rate, was recorded as set forth below. It is clear that the water pick-up rate for the aluminized steel muffler sample was substantially higher than for the mesh bag sample.

|  | Grams of Water Adsorbed | |
|---|---|---|
| Time, Minutes | Aluminized Steel Muffler Tube Sample | Mesh Bag Sample |
| 0 | 0 | 0 |
| 3 | 0.14 | 0.04 |
| 6 | 0.27 | 0.07 |
| 15 | 0.48 | 0.16 |
| 30 | 0.63 | 0.22 |
| 60 | 0.81 | 0.31 |
| 90 | 0.84 | 0.37 |

We claim:

1. An aluminum substrate surface having a solid adsorbent selected from the group consisting of crystalline molecular sieves, activated alumina and mixtures thereof as a coating by a method which comprises:
   (a) heating said surface in an oxygen containing atmosphere to a temperature of at least about 200° C.

and sufficient to enable bonding of the solid adsorbent to said surface; and,
(b) contacting said surface with a slurry comprising the solid adsorbent and a binder selected from the group consisting of volclay, kaolin, sepiolite, attapulgite, silicates, aluminates, activated alumina, and mixtures thereof in a suspending liquid to form a slurry-coated surface and removing sufficient liquid to form an adsorbent coating thereon.

2. The aluminum substrate surface of claim 1 wherein the adsorbent is selected from the group consisting of Zeolite A, Zeolite X, Zeolite Y, and mixtures thereof.

* * * * *